J. SPEAR.

Base-Burning Stove.

No. 4,986. Reissued July 16, 1872.

Witnesses { Jno P. Ley
A. Eickmeyer

James Spear

A.M. PHOTO-LITHOGRAPHIC CO. N.Y. (OSBORNE'S PROCESS.)

UNITED STATES PATENT OFFICE.

JAMES SPEAR, OF PHILADELPHIA, PENNSYLVANIA.

IMPROVEMENT IN BASE-BURNING STOVES.

Specification forming part of Letters Patent No. 89,180, dated April 20, 1869; reissue No. 4,986, dated July 16, 1872.

DIVISION B.

SPECIFICATION.

*To all whom it may concern:*

Be it known that I, JAMES SPEAR, of No. 1116 Market street, Philadelphia, Pennsylvania, have invented certain new and useful Improvements in "Stoves," commonly known as hot-air base-burning stoves, used for heating a parlor and the room above at the same time.

The nature of my invention consists in the construction and arrangement of the casing within which the air is heated previously to its being conducted to the room above. This outer casing for confining the heated air against the stove terminates above the illuminating portion of the stove, and rests on a perforated ring, which holds it in position, and through which air is admitted between the two casings.

To enable others skilled in the art to make and use my invention, I will proceed to describe its construction and operation.

Figure 1:
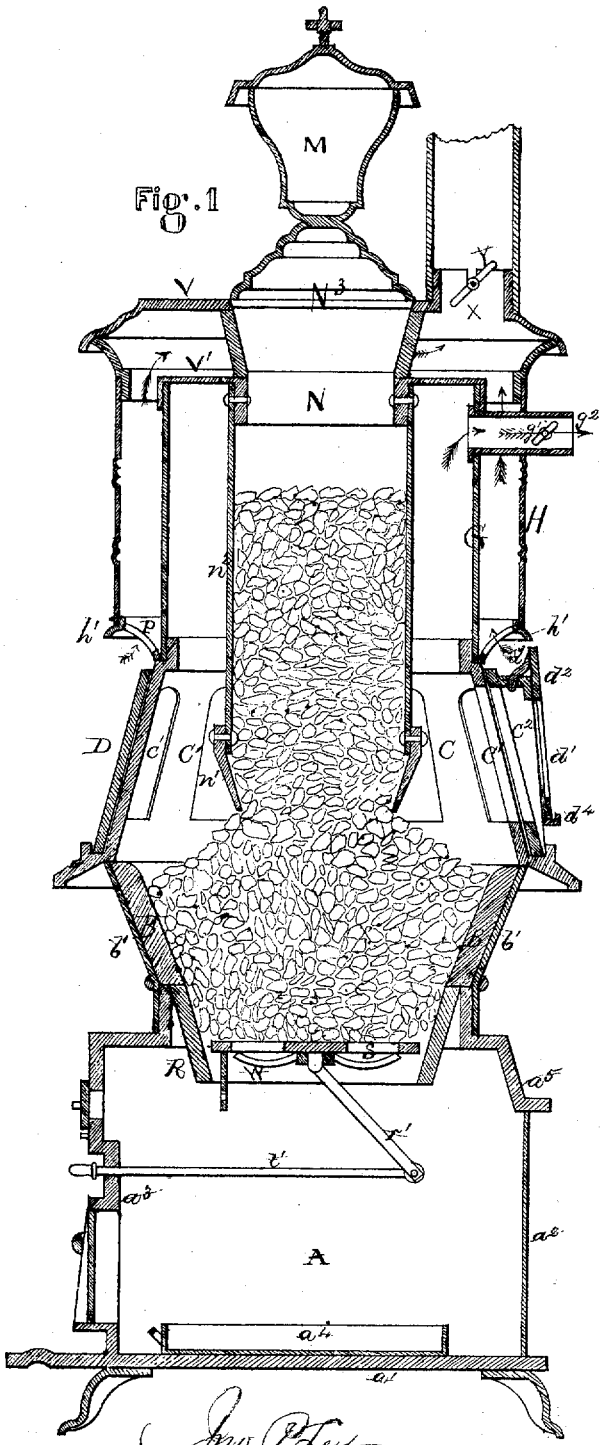
Figure 2:
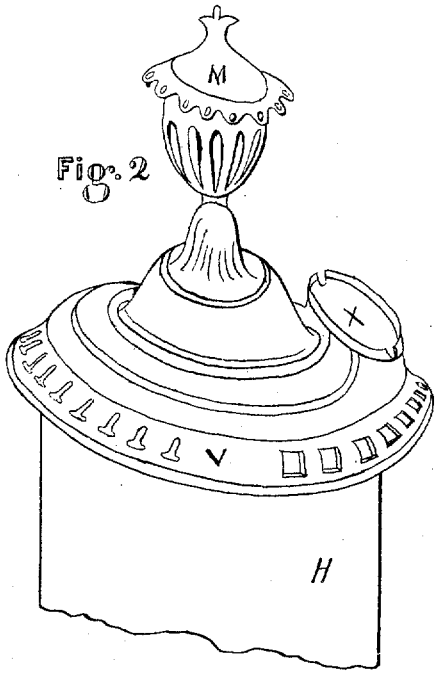

Figure 1 is a section through the stove. Fig. 2 is a perspective view of the crown-top and urn.

A complete description of this, with the exception of the improvements herein detailed, will be found in my patent of July, 1868.

In this stove the smoke and gases from the fuel pass within the sheet-iron cylinder G, out through $g^1$ and damper $g^2$ to the chimney. This cylinder is closed at the top by the cast-iron ring V′, riveted to the reservoir $n^2$. Outside the cylinder G is another sheet-iron case, H, resting upon the cast-iron ring P. This cast-iron ring rests upon the section C, outside of which is the ring D containing the illuminating mica windows, through which a view is obtained of the surface of the fire. This ring P is furnished at its outer edge with an overhanging lip, $h'$, which materially aids in collecting the partially-heated air rising from the illuminating section below. The air thus partially heated is caught by the perforated ring P, through which it enters between the two casings, G and H, as shown by the arrows, and, after becoming further heated, passes upward through outlet X to the rim above. By thus collecting and admitting the air above the illuminating section of the stove I obtain a large heating-surface available for warming the room above, and at the same time have an ornamental illuminating parlor-stove free from any obstruction of the illuminating section. The crown-top V is cast with a central circular opening, $N^3$, covered by a swinging urn, M. By removing the urn to one side the coal can be dumped into the reservoir N, as is usual in reservoir-stoves. At the rear of the crown-top, next the chimney, I cast a branch-outlet, X, for the exit of heated air. A pipe attached to this outlet conveys the heated air to any part of the building which may require it. The lower part of the stove consists of the cast-iron conical section C, having an exterior revolving casing, D, with illuminating-windows. Below this is the fire-pot B and the revolving and dumping grate S. These are described in my patent of July, 1868.

I claim—

1. The combination and arrangement of the perforated ring P, the casings G and H, and the illuminating-section of the stove, as and for the purpose herein described.

2. The construction of a hot-air base-burning stove, free from any obstruction to the illuminating-section, by means of the arrangement of the stove-casing G with the hot-air casing H, so that the inlet for the admission of air between the casings is above the illuminating-section, as herein shown and described.

JAMES SPEAR.

Witnesses:
EDWD. BROWN,
JOHN F. GRANT.